Jan. 4, 1955 E. M. PAYNE ET AL 2,698,882

SOUND RECORDING OR REPRODUCING APPARATUS

Filed Nov. 30, 1949 2 Sheets-Sheet 1

Inventor
EDWIN MALCOLM PAYNE
HENRY MILBURN HARRISON
By Ralph E. Amerton
Attorney Jan. 4, 1955 E. M. PAYNE ET AL 2,698,882

SOUND RECORDING OR REPRODUCING APPARATUS

Filed Nov. 30, 1949 2 Sheets-Sheet 2

Inventors
EDWIN MALCOLM PAYNE
HENRY MILBURN HARRISON
By Ralph E. Atherton
Attorney

United States Patent Office 2,698,882

Patented Jan. 4, 1955

2,698,882

SOUND RECORDING OR REPRODUCING APPARATUS

Edwin Malcolm Payne, Hillingdon, and Henry Milburn Harrison, Hanworth, England, assignors to Electric & Musical Industries Limited, Hayes, England, a company of Great Britain Application November 30, 1949, Serial No. 130,274

Claims priority, application Great Britain December 2, 1948

7 Claims. (Cl. 179—100.2)

Figures 1, 2, 3, 4, 5:
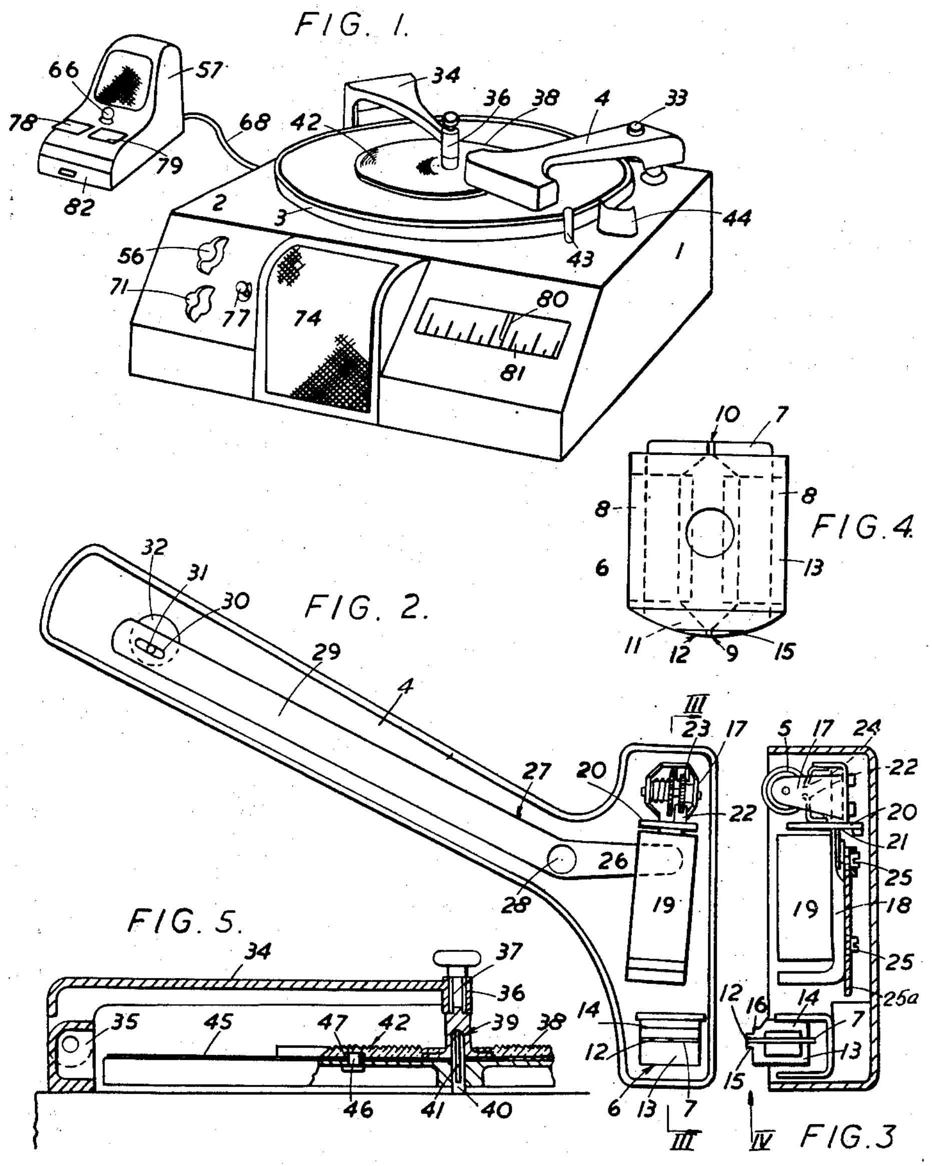

This invention relates to sound recording or reproducing apparatus.

It has been proposed to provide apparatus comprising a recording unit for recording sounds magnetically on a disc of paper or the like coated with magnetic material, and a reproducing unit for reproducing the sounds recorded in such a disc, the apparatus being particularly useful for commercial purposes for recording speech, so that the speech can be subsequently typed on reproduction thereof. Frequently a single unit is designed both for recording or reproducing. In one form of such apparatus each unit comprises a turntable for supporting the record disc, a tracking disc which can be placed on the turntable on top of the record disc thereon and so as to be in driven-connection with the turntable, and a transducing head connected to follower means which by engagement with said tracking disc causes the head to be tracked radially with respect to the record disc on the turntable when the turntable rotates, the tracking disc being separate from the turntable since it has to be taken off each time the record disc is removed.

One object of the present invention is to provide improvements in sound recording or reproducing apparatus, such for example as that described in the preceding paragraph.

According to one aspect of the present invention there is provided magnetic recording or reproducing apparatus comprising a base, a turntable for supporting a record disc rotatably mounted on said base, a tracking disc arranged to be placed on said turntable for rotation coaxially therewith and formed with a spiral track, said tracking disc having a smaller diameter than said turntable to leave uncovered an outer annular zone of the turntable, an electromagnetic signal transducing head mounted for movement across the turntable, means for engaging the spiral track on said tracking disc and connected with said transducing head for movement therewith to cause said transducing head to be tracked across said outer zone of the turntable on rotation of said turntable with said tracking disc thereon, and a supporting structure having said tracking disc rotatably mounted thereon, said supporting structure being pivotally attached to said base for movement between an operative position with said tracking disc located on said turntable and an inoperative position with said tracking disc displaced from said turntable.

Another object of the present invention is to simplify the coupling between the turntable and the record disc on the one hand and between the turntable and the tracking disc on the other hand, and with this object in view a friction pad is fixed on the upper surface of the turntable and a friction pad is fixed on the undersurface of the tracking disc so that when a record disc is placed on the turntable it is sandwiched between the friction pads and the friction pads constitute the sole driving connection from the turntable to the record disc and the tracking disc.

Figure 6:
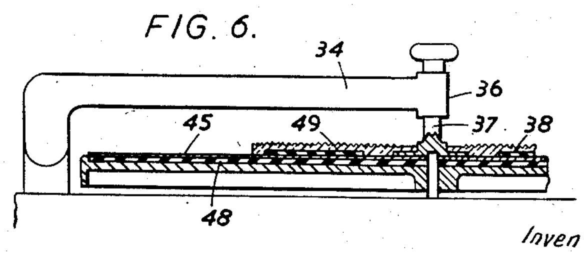
Figure 7:
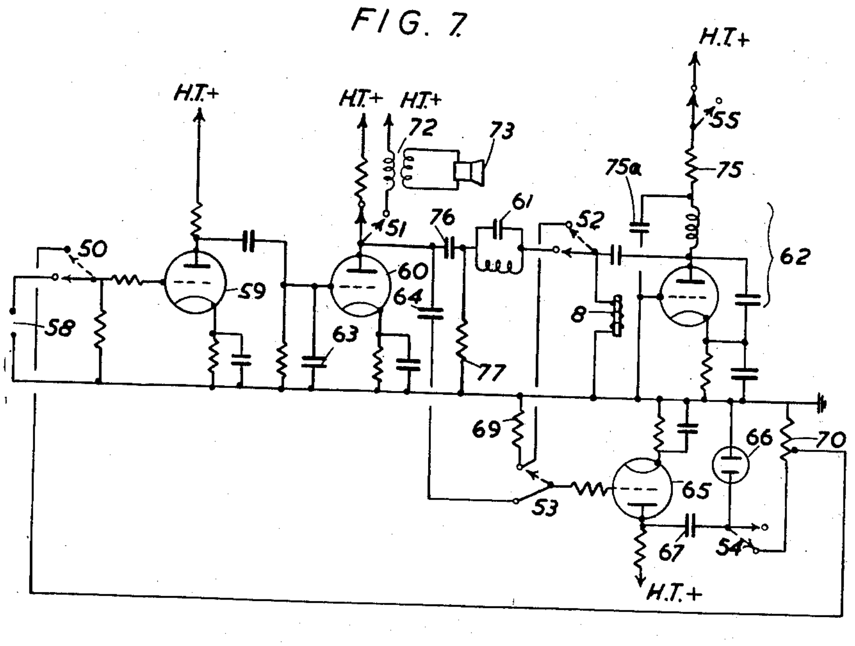
Figure 8:
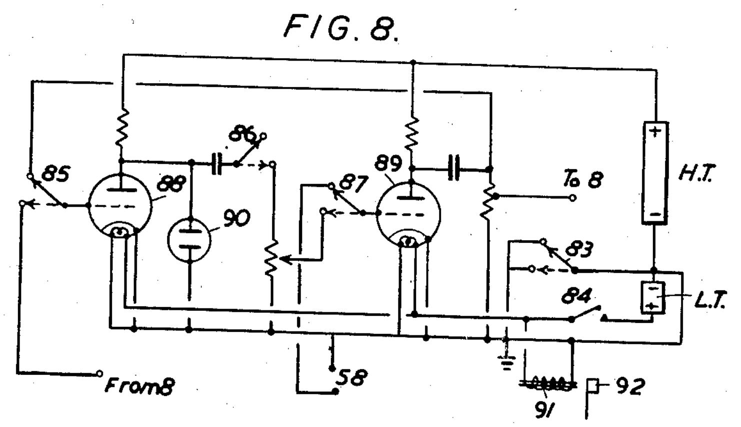

In order that the said invention may be clearly understood and readily carried into effect, the same will now be more fully described with reference to the accompanying drawings, in which:

Figure 1 is a perspective view of one form of apparatus according to the present invention, Figure 2 is an underneath plan view of part of the apparatus shown in Figure 1, Figure 3 is a sectional elevation on the line III—III of Figure 2, Figure 4 is a detail view of part of Figure 3 in the direction of the arrow IV, Figure 5 is a detail sectional view of part of the apparatus shown in Figure 1, Figure 6 is a similar view of a modification, Figure 7 illustrates diagrammatically part of the electrical circuit of the apparatus shown in Figure 1, and Figure 8 illustrates a modification of Figure 7.

Referring to the drawings, the apparatus illustrated in Figure 1 is capable of use selectively either for recording or reproduction. The apparatus comprises a casing 1 having a top panel 2 above which is mounted an electrically driven turntable 3, the motor for driving the turntable 3 being housed in the casing 1. A supporting arm 4 is mounted on the top panel 2 in a manner similar to a phonograph pickup and the arm 4 carries at its forward end a tracking wheel 5 and an electro-magnetic transducing head 6 (Figures 2 and 3). The transducing head consists of a small magnetic core 7 composed of two laminations which co-operate as shown to form a substantially rectangular core. Windings 8 are provided on the vertical limbs of the core. Nonmagnetic gaps 9 and 10 are formed between the laminations to produce pole tips, and the pole tips in the lower horizontal limb 11 of the core, in which the gap 9 is formed, having an arcuate edge 12. The core 7 is clamped between an insulating plate 13 and a metallic but non-magnetic plate 14 and the underside of the plates 13 and 14 are formed with small segments 15 and 16 of reduced thickness as compared with the plates 13 and 14. The segments 15 and 16 project to the level of the edge 12 of the core and abut against opposite sides of the core 7. The arcuate edge 12 of the core is therefore protected from undue wear by the segments 15 and 16. The windings 8 are suitably connected by conductors, not shown, to the electrical circuit of the apparatus shown in Figure 7.

The tracking wheel 5 is carried on a shaft journalled in trunnions 17 provided on a carriage 18 which supports an electromagnet 19, whose axis is normal to the axis of the tracking wheel 5. The armature 20 of the electromagnet is resiliently secured to the carriage by an L-shaped blade spring 21 and it carries a pawl 22 which projects to engage a ratchet wheel 23 fast on the shaft of tracking wheel 5. A locking detent 24 is also secured to the carriage 18 and engages the ratchet wheel 23 to prevent rotation of the tracking wheel 5 except in the clockwise direction as seen in Figure 3. The armature 20 is so adjusted that when the electromagnet 19 is energised the tracking wheel is rotated in the clockwise direction by the angular extent of one tooth on the tracking wheel 5, the latter being provided with teeth of the same pitch as the teeth of the pawl. The carriage 18 is supported from a bracket 25*a* secured to arm 4 by studs 25 which allow limited horizontal movement in the direction of the axis of the electromagnet 19 and the carriage is linked to the end of one arm 26 of a lever 27 fulcrumed in the supporting arm 4 at 28. The other and longer arm 29 of the lever projects on the underside of the arm 4 to the rear of the arm where it is formed with a slot 30 which is engaged by an eccentric pin 31 on a disc 32. The disc 32 is mounted on a shaft which projects to the top of the arm 4 and is there provided with a control knob 33 so that on rotation of the knob 33 a limited horizontal movement can be imparted to the carriage 18 and hence tracking wheel 5 so as to adjust the separation between latter and the transducing head 6, the maximum extent of the adjustment being the distance of one pitch of the teeth on the tracking wheel.

A further supporting arm 34 is pivoted to a bracket 35 on the top panel 2 (see Figure 5) so that the arm 4 can be pivoted about a horizontal axis tangential to the turntable. The arm 34 projects to the centre of the turntable where it is provided with a bush 36. A spindle 37 is journalled relatively loosely in the bush 36 and carries at its lower end a tracking member in the form of a disc 38 which is approximately half the diameter of the turntable 3. The tracking disc 38 is thus secured to the apparatus. When the arm 34 is in the lowered position shown in Figures 1 and 5, the tracking disc 38 rests on the turntable 3 coaxially therewith and the spindle 37 has a central hole 39 which is adapted to fit over the end of the turntable spindle 40 which projects as shown in Figure 5 above the turntable. The spindle 40 is formed with a keying projection 41, the hole 39 being formed with a corresponding slot to engage the projections 41, so that when the tracking disc is lowered on the turntable, driving connection is secured between the turntable and the tracking disc. Instead of forming the spindle 40 with the keying projection 41, the spindle may alternatively have an asymmetric (for example polygonal) cross section, the hole 39 then having a corresponding shape. The tracking disc 38 is formed with a spiral groove, indicated in Figure 1 at 42, running from the outer edge of the disc to the centre, the groove having the same pitch as the teeth on the tracking wheel 5, said teeth being arranged to mesh with the groove 42. As can be seen in Figure 2, the axis of the tracking wheel 5 is so disposed with reference to the arm 4 that when the tracking disc 38 is positioned on the turntable 3 and the arm 4 lowered to the operative position shown in Figure 1 one tooth on the tracking wheel 5 can mesh with the groove. In the operative position of the arm 4, moreover, the arcuate surface 12 of the magnetic core 7 rests on the turntable with the gap 9 at the centre of contact and with the axis of the core substantially radially disposed. When the meshing tooth on the tracking wheel is in the outermost part of the tracking groove 42, the surface 12 is near the outside edge of the turntable. The outermost operative position of the arm 4 is determined by a stop 43 fixed to the top panel 2.

When it is desired to use the apparatus, the tracking disc is removed from the turntable by raising the arm 34 about its pivot while the arm 4 is pivoted to the side where a rest 44 is provided to receive it. A centrally apertured record disc 45 such as a disc of paper, coated or otherwise treated with magnetic material, is then placed on the turntable and the tracking disc replaced on top as shown in Figure 5. To cause the record disc to rotate with the turntable, the latter is provided with a projecting eccentric stud 46 (Figure 5) and the disc 45 has a complementary hole 47 adapted to fit closely over the stud 46. A suitable slot is provided on the underside of the tracking disc 38 to accommodate the upper end of the stud 46 without, however, making driving engagement therewith. The stud 46 and the keying projection 41 positively determine the angular position of each record disc on the turntable in relation to the tracking disc 38. On operation of the apparatus, the turntable 3 is rotated and interengagement between the tracking wheel 5 and the groove 42 on the tracking disc 38 causes the arm to be tracked radially inwards, so that the surface 12 of the core traces a spiral track on the record disc. The detent 24 prevents any tendency for the rotation of the tracking disc merely to cause rotation of the tracking wheel. Since, as aforesaid, the angular position of the record disc 45 is positively determined in relation to the tracking disc 38, the spiral track traced on a tracking disc 45 on one operation of the record coincides substantially with that traced on any subsequent operation of the same apparatus or other apparatus of the same construction. However, any minor mis-alignment between the surface 12 and a track previously traced can be corrected by manipulating the knob 33 to adjust the separation between the tracking wheel 5 and the transducing head 6. When accurate alignment is achieved, this can readily be detected by the clarity of the reproduction obtained. The function of the electro-magnet 19 and the associated mechanism will be referred to subsequently.

In the modification of the apparatus shown in Figure 6, the driving connection between the turntable 3, the record disc 45 and the tracking disc 38 is obtained by covering the top surface of the turntable with a layer of rubber 48 while an annular part of the lower surface of the tracking disc is similarly covered by a layer of rubber 49. The layers 48 and 49 may alternatively be formed of other materials having a relatively high coefficient of friction. In this modification friction between the turntable and the record disc on the one hand, and the record disc and the tracking disc on the other hand, causes both the discs 38 and 45 to be driven by the turntable 3. In apparatus embodying this modification, misalignment between the surface 12 and a previously traced track on a record disc 45 can be corrected merely by holding the tracking disc against rotation while allowing the turntable 3 and the record thereon to rotate.

Figure 7 illustrates part of the electrical circuit which is contained in the casing 1 of the apparatus shown in Figure 1. The circuit comprises a series of switches 50, 51, 52, 53, 54 and 55, ganged to a single control knob 56 (Figure 1) so that they can be operated concomitantly. In one position of the control knob the switches assume the positions shown in full lines in Figure 7 and the apparatus is then conditioned for recording. To effect recording, an unmagnetised record disc 45 is placed on the turntable and a suitable microphone, such as indicated at 57 in Figure 1, is connected to the apparatus by means of a cable 68 which when plugged to the casing 1 connects the microphone between terminals 58. The circuit of Figure 7 will now be described on the assumption that the switches 50 . . . 55 are in the full line positions. Electrical signals representative of sounds from the microphone 57 are applied to a first amplifying valve 59 and thence after amplification to a second amplifying valve 60. The signals set up at the anode of this valve are fed via a tuned blocking circuit 61 to the windings 8 of the transducing head 6. The circuit also includes an oscillator of the Colpitts type, which is indicated in general by the reference numeral 62. The oscillator 62 is is arranged to operate with a relatively high frequency, say 30 kilocycles per second and the oscillations are applied to the windings 8 in parallel with the signals from the amplifying valve 60. The oscillations are provided for biassing purposes in accordance with the usual technique adopted in magnetic recording and the signals from the anode of the valve 60 are recorded in known manner magnetically along the track traced on the record disc 45. The circuit 61 is tuned to the frequency of the biassing oscillations. A condenser 63 is provided to bypass any stray bias voltage picked up on any preceding control electrode. The signals set up at the anode of the valve 60 in addition to being fed to the windings 8 are fed via a blocking condenser 64 and switch 53 to a further amplifying valve 65 which has a neon or other suitable glow discharge tube 66 connected in shunt as shown, the neon tube being connected to the anode of the valve 65 by a blocking condenser 67. The neon tube 66 is fitted to the microphone 57 as shown in Figure 1, electrical connection to the tube being made by conductors in the cable 68. The arrangement is such that the neon tube conducts only if the signals set up at the anode of the valve 65 (and hence at the anode of the valve 60) have sufficient amplitude for adequate recording. The speaker therefore is given a visible indication whether or not he is speaking sufficiently loudly or has the microphone suitably positioned. By providing the neon tube 66 in the output circuit of a valve 65 not included in the amplifier channel between the microphone 57 and windings 8, the neon tube has no tendency to limit the recorded signals, so that speech clipping is avoided.

When the control knob 56 is operated to change the switches 50 . . . 55 to the positions indicated by dotted lines in Figure 7, the apparatus is conditioned for reproduction of signals, if the disc 45 on the turntable bears an existing record. The microphone 57 is disconnected from the control electrode of the valve 59 and the windings 8 of the transducing head are connected by the switches 52 and 53 to the control electrode of the valve 65, the resistance 69 serving as the input impedance for said valve. Electrical signals induced in the windings 8 are amplified by the valve 65 and fed via the condenser 67, switch 54 and switch 50 to the control electrode of the valve 59, a volume control potentiometer 70, which can be operated by the control knob 71 (Figure 1) being interposed as shown between the switches 54 and 50. When the apparatus is conditioned for reproduction the amplitude of signals set up at the anode of the valve 65 is insufficient to render the neon tube conductive, if the microphone 57 is not unplugged from the apparatus. The reproduced signals undergo two further stages of amplification in the valves 59 and 60 and are then fed via the switch 51 and a transformer 72 to a loudspeaker 73. The loudspeaker 73 is mounted in the casing 1 behind screen 74 (Figure 1). The switch 55 disconnects the oscillator 62 from the high tension supply so that the oscillator is rendered inoperative. A feed resistance 75 and condenser 75a are provided in the oscillator 62 as shown for decoupling purposes. Shock excitation of the magnetic core 8 is liable to occur on switching the apparatus from the reproducing to the recording condition due to the fact that the blocking condenser 76 between the anode of the valve 60 and the tuned blocking circuit 61 becomes charged substantially to the H. T. potential when the apparatus is conditioned for reproduction. On switching to the recording condition the anode of the valve 60 experiences a sudden drop in potential and this potential drop can be communicated through the condenser 76 to cause a current surge through the winding 8 in excess of the normal operating current. To avoid this liability a resistance 77 is connected in shunt with the windings 8, as shown, the resistance allowing the condenser 76 to be discharged, thereby inhibiting the aforesaid current surge. The other components in the circuit illustrated in Figure 7 are employed in a conventional manner and are, therefore, not described in detail. Provision may be made in the apparatus for feeding the amplified reproduced signals to headphones instead of loudspeaker 73, when the apparatus is conditioned for recording. A master switch 77 controls the power supply to the driving motor and the valve circuits.

The microphone 57 is fitted with two control keys 78 and 79 which enable operation of the apparatus to be controlled from the microphone as described in the British Patent No. 649,260 issued to Electric and Musical Industries Limited after the master switch 77 has been operated to switch on the power supply. As described in the aforesaid patent specification, the key 78 on being depressed, alternately starts and stops rotation of the turntable 3. The key 79, on being depressed, causes a current pulse to be transmitted to the electro-magnet 19 and a consequent rotation of the tracking wheel by one tooth. The transducing head 6 is therefore moved backwards by the distance of one pitch of the groove 42. Electrical connection to the keys 78 and 79 is made by conductors in the cable 68. For reproduction, a control unit having two keys equivalent to 78 and 79 and capable of being attached in a convenient position to a typewriter may be provided.

A pointer 80 disposed in front of a scale 81 is mechanically connected in the casing 1 to the supporting arm 4 so that as the arm moves radially inward, on operation of the apparatus, the arm traverses the scale 81 and indicates the fraction of recording time which remains, the scale 81 being for example, calibrated in minutes. The apparatus may, further, be provided with a bell signal which rings when for example only one half minute of recording time remains. If desired the bell signal may be adjustable to vary the time of warning. The microphone 57 has a drawer 82 in its casing, in which "cueing" (i. e. memoranda) sheets may be provided, marked to correspond to the markings on the scale 81, so that notes relevant to the different parts of the recording can be made.

The apparatus illustrated in Figure 1 may be modified by providing the turntable 3 with a clockwork drive and modifying the amplifier circuit for battery operation, these modifications being especially advantageous if a portable apparatus is required. In such a battery operated apparatus the circuit shown in Figure 7 may be modified as indicated in Figure 8. As shown in Figure 8 a switch 83 is provided for applying the H. T. voltage to the circuit, while a separate switch 84 is provided in the low-tension circuit of the apparatus. The switch 83 is ganged with switches 85, 86 and 87 and with these switches in the positions indicated by full lines the apparatus is conditioned for recording. Signals applied between the microphone terminals 58 are fed to the grid of an amplifier valve 89 and the amplified signals are fed from the anode of 89 to the windings 8 as in Figure 7, via one or more subsequent stages of amplification if desired. The amplified signals are also fed via switch 85 to an amplifying valve 88 having a neon tube 90 connected in shunt as shown. The filaments of the valves 88 and 89, as well as of any other valves in the circuit, are connected in the low tension circuit as shown, and this circuit includes an electro-magnet winding 91 which controls the brake 92 for the turntable 3. With this arrangement, if the switches 83, 85, 86 and 87 are operated to condition the apparatus for recording, before closing the switch 84, the full voltage of the high tension battery is applied across 90. If the voltage is sufficient to operate the apparatus the neon tube conducts and visible signal is given, the neon tube being for example fitted in the microphone casing, as described with reference to the tube 66, or alternatively on the casing 2, since it may be desirable to reduce the microphone to the smallest possible size. On subsequently closing the switch 84 the valves conduct, the potential at the anode of the valve 89 falls and the neon tube is extinguished, and thereafter serves as a speech level indicator as described with reference to the tube 66 in Figure 7. Operation of the switch 84 also releases the brake on the turntable which commences to rotate. By moving the switches 83, 85, 86 and 87 to the position indicated in dotted lines, the apparatus is conditioned for reproduction, signals picked up by the windings 8 being applied to the control electrode of the valve 88 amplified in said valve and then fed for further amplification to the valve 89 and thence to the loudspeaker or headphones (not shown). In this condition of the apparatus, the voltage variations set up at the anode of the valve 88 are of insufficient amplitude to render the neon tube conductive so that the neon tube functions only as a battery voltage indicator as above described.

What we claim is:

1. Sound recording or reproducing apparatus comprising a base, a turntable for supporting a record disc rotatably mounted on said base, a tracking disc arranged to be placed on said turntable for rotation coaxially therewith, said tracking disc having a smaller diameter than said turntable to leave uncovered an outer annular zone of the turntable, a transducing head mounted for movement across the turntable, means for engaging said tracking disc and connected with said transducing head for movement therewith to cause said head to be tracked across said outer zone of the turntable on rotation of said turntable with said tracking disc thereon, and a supporting structure having said tracking disc rotatably mounted thereon, said supporting structure being displaceably attached to said base for movement between an operative position with said tracking disc located on said turntable and an inoperative position with said tracking disc displaced from said turntable.

2. Sound recording or reproducing apparatus according to claim 1, said supporting structure comprising an arm pivoted to said base for pivotal movement about an axis normal to the axis of the turntable, said tracking disc being located above said turntable in the inoperative position of said arm.

3. Magnetic recording or reproducing apparatus comprising a base, a turntable for supporting a record disc rotatably mounted on said base, a tracking disc arranged to be placed on said turntable for rotation coaxially therewith and formed with a spiral track, said tracking disc having a smaller diameter than said turntable to leave uncovered an outer annular zone of the turntable, an electromagnetic signal transducing head mounted for movement across the turntable, means for engaging the spiral track on said tracking disc and connected with said transducing head for movement therewith to cause said transducing head to be tracked across said outer zone of the turntable on rotation of said turntable with said tracking disc thereon, and a supporting structure having said tracking disc rotatably mounted thereon, said supporting structure being pivotally attached to said base for movement between an operative position with said tracking disc located on said turntable and an inoperative position with said tracking disc displaced from said turntable.

4. Sound recording or reproducing apparatus comprising a base, a turntable for supporting a record disc rotatably mounted on said base, driving means mounted on said base for rotating said turntable, a displaceable tracking member for location on top of a record disc in place on said turntable, a friction pad fixed on the upper surface of said turntable, a friction pad fixed on the under surface of said tracking member, said friction pads having a high coefficient of friction to cause rotational movement to be transmitted from said turntable to a record disc in place on said turntable and to said tracking member in place on said record disc, a transducing head mounted for movement across said turntable, and means for engagement with said tracking member and connected with said transducing head for movement therewith to cause said transducing head to be tracked across a record disc on rotation of said turntable with the record disc and said tracking member in place thereon.

5. Sound recording or reproducing apparatus according to claim 4, said friction pads being formed of rubber.

6. Magnetic recording apparatus comprising a base, a turntable rotatably mounted on said base, a flexible record disc comprising magnetic material for location on said turntable coaxially therewith, driving means mounted on said base for rotating said turntable, a displaceable tracking disc, formed with a spiral track on one surface, for location with said surface uppermost on top of and coaxially with said record disc in place on said turntable, a friction pad fixed on the upper surface of the turntable, a friction pad fixed on the under surface of said tracking disc, said friction pads having a high coefficient of friction to transmit rotational movement from the turntable to said record disc in place on said turntable and to the tracking disc in place on said record disc, an electromagnetic signal transducing head mounted for movement across said turntable, and means for engagement with the track on said tracking member and connected with said transducing head for movement therewith to track said transducing head across said record disc on rotation of said turntable with said record disc and said tracking member in place thereon, the friction pads on said turntable and said tracking disc constituting the sole driving connection from said turntable to sad record disc and said tracking disc.

7. Sound recording or reproducing apparatus comprising a base, a turntable for supporting a record disc rotatably mounted on said base, driving means mounted on said base for rotating said turntable, a displaceable tracking disc for location on top of a record disc in place on said turntable, said tracking disc having a smaller diameter than said turntable to leave uncovered an outer annular zone of a record disc on said turntable, a friction pad fixed on the upper surface of said turntable, a friction pad fixed on the under surface of said tracking disc, said friction pads having a high coefficient of friction to transmit rotational movement from said turntable to a record disc in place on said turntable and to said tracking disc in place on said record disc, a transducing head mounted for movement across said turntable, means for engagement with said tracking disc and connected with said transducing head for movement therewith to cause said transducing head to be tracked relatively to said outer zone of a record disc on rotation of said turntable with the record disc and said tracking disc in place thereon, and a supporting arm having said tracking disc rotatably mounted thereon and displaceably attached to said base for movement between an operative position with said tracking disc located on said turntable and an inoperative position with said tracking disc displaced from said turntable.

References Cited in the file of this patent

UNITED STATES PATENTS

| | | |
|---|---|---|
| 759,348 | Clark | May 10, 1904 |
| 2,318,098 | Rieber | May 4, 1943 |
| 2,416,135 | Appleby | Feb. 18, 1947 |
| 2,449,291 | Gay | Sept. 14, 1948 |
| 2,484,097 | Keller | Oct. 11, 1949 |
| 2,489,685 | Sultan | Nov. 29, 1949 |
| 2,514,577 | Heller | July 11, 1950 |
| 2,535,480 | Begun | Dec. 26, 1950 |
| 2,535,495 | James | Dec. 26, 1950 |
| 2,539,121 | Dashiell | Jan. 23, 1951 |
| 2,563,882 | Stolaroff | Aug. 14, 1951 |

FOREIGN PATENTS

| | | |
|---|---|---|
| 352,391 | Great Britain | June 29, 1931 |